United States Patent
Hagen et al.

[15] 3,681,379
[45] Aug. 1, 1972

[54] 2-CARBAMYL-2-IMIDAZOLINES AND METHOD FOR THEIR PRODUCTION

[72] Inventors: Helmut Hagen, Frankenthal; Friedrich Becke, Heidelberg, both of Germany

[73] Assignee: Badische Anilin- & Soda-Fabrik Aktiengesellschaft, Ludwigshafen, Rhine, Land Rheinland-Pfalz, Germany

[22] Filed: April 22, 1970

[21] Appl. No.: 30,935

[30] Foreign Application Priority Data

April 26, 1969 Germany............P 19 21 341.3

[52] U.S. Cl..................260/247.5 R, 117/138.8 R, 117/138.8 F, 117/139.5, 260/268 C, 260/293.7, 260/309.6
[51] Int. Cl.............................................C07d 49/34
[58] Field of Search........260/309.6, 247.5 R, 268 C, 260/293.7

[56] References Cited

UNITED STATES PATENTS 3,147,275  9/1964  Fruhstorfer et al........260/309.6
3,365,462  1/1968  Holan et al. ...............260/309.6

FOREIGN PATENTS OR APPLICATIONS 229,606  2/1944  Switzerland..............260/309.6
234,926  3/1945  Switzerland..............260/309.6

OTHER PUBLICATIONS

Baganz et al. I Chem. Abst. Vol. 63, column 7008 (1965). QD1.A51
Baganz et al. II Chem. Ber. Vol. 98, pages 2170– 2173 (1965). QD1.D4
Lehr et al. Chem. Abst. Vol. 38, column 6275 (1944). QD1.A51
Urech et al. Chem. Abst. Vol. 45, columns 2478– 2479 (1951). QD1.A51
Forssell Berichte Vol. 24, pages 1,847– 1,848 (1891). QD1.D4
Hofmann Imidazole and Its Derivatives Part I page 217 N.Y., Interscience, 1953. QD401.H6

*Primary Examiner*—Natalie Trousof
*Attorney*—Johnston, Root, O'Keeffe, Keil, Thompson & Shurtleff

[57] ABSTRACT

Production of 2-carbamyl-2-imidazolines by reacting haloacetamides with 1,2-alkylene diamines and elementary sulfur, and the 2-carbamyl-2-imidazolines.
The new compounds are auxiliaries for the textile and leather industries, plant protection agents and valuable starting material for the manufacture of textile and leather auxiliaries and plant protection agents.

6 Claims, No Drawings

2-CARBAMYL-2-IMIDAZOLINES AND METHOD FOR THEIR PRODUCTION

This invention relates to a process for the production of carbamyl-2-imidazolines by reaction haloacetamides with 1,2-alkylene diamines and elementary sulfur. The invention also relates to new substances of this kind.

The Berichte der Deutschen Chemischen Gesellschaft, 24, 1846 (1891) and 25, 2132 et seq. (1892) disclose that imidazolines which are substituted in the 2-position may be made by reacting thioamides with ethylene diamine. Other methods of manufacture are summarized in A. Weissberger's monograph "Imidazole and its Derivatives, Part I" (1953, Interscience Publishers, Inc., New york, London), pp. 213–218. 2-Imidazolines substituted in the 2-position by a carbonamide function have not been hitherto described in the literature.

It is an object of the present invention to provide a new process for the production of 2-carbamyl-2-imidazolines in a more economical manner and in good yield and high purity.

A further object of this invention is to provide the new 2-carbamyl-2-imidazolines themselves.

These and other objects are achieved and 2-carbamyl-2-imidazolines of the general formula:

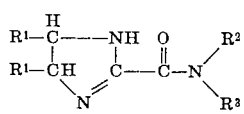

where $R^1$, $R^2$ and $R^3$, which may be the same or different, stand for hydrogen or an aliphatic or cycloaliphatic radical and in which $R^3$ may also stand for an araliphatic or aromatic radical or $R^2$ and $R^3$ may be joined to the adjacent nitrogen atom to form a heterocyclic ring, are advantageously produced by reacting haloacetamides of the general formula

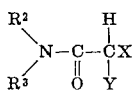

where $R^2$ and $R^3$ have the meanings stated above, X is a halogen atom and Y is hydrogen or a halogen atom, with 1,2-alkylene diamines of the general formula:

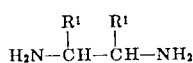

wherein each $R^1$ has the meaning stated above, and elementary sulfur.

The reaction may be represented by the following formulas, which illustrate the use of N-n-butylchloroacetamide (reaction 1) and N-n-butyl-dichloracetamide (reaction 2) respectively:

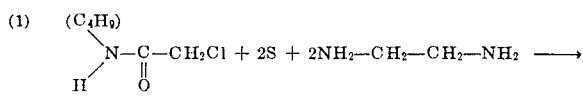

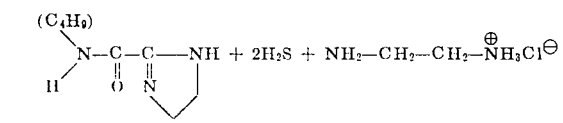

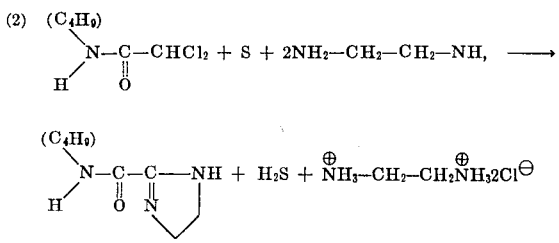

Compared with the prior art the process of the invention provides a large number of 2-carbamyl-2-imidazolines in good yield and a high degree of purity in a simpler and more economical manner.

Preferred haloacetamides of the general formula II, preferred 1,2-alkylene diamines of the general formula III and accordingly preferred end products I are those in the formulas of which the radicals $R^1$, $R^2$ and $R^3$, which may be the same or different, stand for hydrogen or alkyl radicals of from one to 18 carbon atoms, most preferably of from one to 12 carbon atoms, or cycloalkyl radicals of from five to 12 carbon atoms and additionally $R^3$ may stand for an optionally substituted benzyl or phenyl radical or $R^2$ and $R^3$ may be joined to the adjacent nitrogen atom to form a five or six membered heterocyclic ring which may contain in addition to the said nitrogen atom a further nitrogen atom or an oxygen atom, and X stands for chlorine and Y stands for hydrogen or chlorine. The said radicals and the heterocyclic ring may be further substituted by groups and/or atoms which are inert under the conditions of reaction, such as alkyl and alkoxy groups of from one to four carbon atoms and alkoxy-alkyl groups of from two to four atoms. The said araliphatic or aromatic radical may carry similar substituents. The starting materials II and III and the elementary sulfur are normally reacted in stoichiometric amounts. It is also possible to use starting material III and/or the sulfur in excess, say up to 1.5 times, based on the starting material II.

The starting material III used for binding the halogen hydracid formed may be replaced by an equivalent amount of any base capable of binding halogen hydracid. Examples of such bases are tertiary amines such as triethylamine; and oxides and hydroxides of alkali and alkaline earth metals such as sodium hydroxide, potassium hydroxide and calcium oxide.

The following compounds are examples of suitable starting materials II and III: monochloro-, dichloro-, bromo-, iodo- and chlorobromo-acetamides; corresponding N-butyl, N-(3-chloro-4-methyl-phenyl), N-cyclohexyl, N,N-di-n-propyl, N,N-di-cyclohexyl, N-methyl-N-cyclohexyl, N-dodecyl, N-stearyl, N-(2,4-dichlorophenyl) and N-benzyl compounds; and analogous tertiary amides with morpholine, piperidine and piperazine; 1,2-diamino-ethane, 1,2-diamino-propane, 1,2-diamino-n-butane, 2,3-diamino-butane, 1,2-diamino-1-cyclohexyl-ethane and 3,4-diamino-hexane.

The reaction is normally carried out at a temperature between 50° and 180° C and preferably between 80° and 150° C, at atmospheric or elevated pressure, continuously or batchwise. It is convenient to use organic solvents which are inert under the conditions of reaction, such as aromatic hydrocarbons, e.g., benzene, toluene and xylene; alkanols such as ethanol, n-propanol, isobutanol, n-butanol; cyclic ethers such as dioxane; glycol ethers, particularly when elevated temperatures are used, such as ethylene glycol mono(methyl-or ethyl) ether and 1,2-propylene glycol diethyl ether; and appropriate mixtures thereof. The molar ratio of solvent to starting material II is preferably 1-10:1.

The reaction may be carried out as follows:
a mixture of the starting material II, sulfur and, optionally, solvent is prepared and starting material III is added thereto portionwise over 1 to 2 hours with thorough mixing. When no more hydrogen sulfide is evolved, the mixture is filtered and the desired product is separated from the filtrate in conventional manner, for example by crystallization, if necessary after driving off the solvent.

The new compounds obtainable from the process of the invention are auxiliaries for the textile and leather industries, plant protection agents and also valuable intermediates in the manufacture of textile and leather auxiliaries and plant protection agents. Thus they may be used to give synthetic fibrous materials such as polyesters and polyamides an antistatic finish. Moreover, the substances of the invention, when used in quantities ranging from 5 to 50 g/kg of fibrous material, provide in addition to the antistatic effect a soft or firm handle of the finished textile material depending on the constitution of the compound. Preferred compounds for this use are 2-carbamyl-2-imidazolines of the general formula I in which the radicals $R^1$, $R^2$ and $R^3$ are the same or different and stand for hydrogen atoms, alkyl radicals of from one to 18 carbon atoms or cycloalkyl radicals of from five to 12 carbon atoms, and $R^3$ may also stand for an optionally substituted benzyl or phenyl radical or $R^2$ and $R^3$ may be joined to the adjacent nitrogen atom to form a five or six membered heterocyclic ring, which may contain in addition to the said nitrogen atom a further nitrogen atom or an oxygen atom.

In the following Examples the parts are by weight.

EXAMPLE 1

In a stirred apparatus there are dissolved 75 parts of N-butyl-chloroacetamide and 32 parts of sulfur in 500 parts of toluene. To this mixture there are slowly added over a period of 2 hours and at a temperature of 100° C 65 parts of ethylene diamine. On termination of the evolution of hydrogen sulfide (after about 3 hours), the hot toluene solution is decanted from the precipitated ethylene diamine hydrochloride and then filtered and cooled to about 5°-10° C. The precipitated final product is filtered off, washed with a little acetone and dried. There are thus obtained 74 parts of 2-(N-butyl-carbamyl)-2-imidazoline, m.p. 165° C. This corresponds to a yield of 87 percent of theory.

EXAMPLE 2

In a stirred apparatus 109 parts of N-(3-chloro-4-methylphenyl)-chloroacetamide and 32 parts of sulfur are heated in 800 parts of toluene at 105° C and 65 parts of ethylene diamine are slowly added over 2 hours. The reaction mixture is then stirred for a further period of approximately 4 hours at a temperature of 110° C. After working up in a manner similar to that described in Example 1 there are obtained 98 parts of 2-(N-3-chloro-4-methylphenyl-carbamyl)-2-imidazoline, m.p. 166°-167° C. After recrystallizing from dimethyl formamide the compound has m.p. 168° C. The yield is 82 percent of theory.

EXAMPLE 3

In a stirred vessel 84 parts of N-dodecylchloroacetamide and 21 parts of sulfur dissolved in 800 parts of toluene are heated at 105° C. 45 Parts of ethylene diamine are slowly added over 1 hour, and the mixture is then stirred at 110° C for a further 6 hours. After working up in a manner similar to that described in Example 1 there are obtained 76 parts of 2-(N-dodecylcarbamyl)-2-imidazoline, m.p. 143°-145° C. The yield is 81 percent of theory.

EXAMPLE 4

Example 1 is repeated except that 86 parts of N-stearylchloroacetamide are reacted with 16 parts of sulfur and 33 parts of ethylene diamine in 500 parts of toluene. There are obtained 74 parts of 2-(N-stearylcarbamyl)-2-imidazoline, m.p. 135°-136° C, corresponding to a yield of 81 percent of theory.

EXAMPLE 5

In a process similar to that described in Example 1 60 parts of N-(2,4-dichlorophenyl)chloroacetamide are reacted with 16 parts of sulfur and 33 parts of ethylene diamine in 500 parts of toluene. There are obtained 58 parts of 2-(N-2,4-dichlorophenylcarbamyl)-2-imidazoline, m.p. 171° C, corresponding to a yield of 90 percent of theory.

EXAMPLE 6

Example 1 is repeated except that 46 parts of N-benzylchloroacetamide are reacted with 16 parts of sulfur and 33 parts of ethylene diamine in 500 parts of toluene. There are obtained 45 parts of 2-(N-benzylcarbamyl)-2-imidazoline, m.p. 180°-191° C, corresponding to a yield of 88 percent of theory.

EXAMPLE 7

In a stirred vessel 67 parts of N-isopropyl chloroacetamide and 32 parts of sulfur dissolved in 600 parts of isobutanol are heated at 100° C. To this mixture there are slowly added 74 parts of 1,2-propylene diamine, and the mixture is then stirred under reflux for a further 6 hours. After removing the hydrochloride, the solvent is distilled off and the residue is recrystalized from ligroin. There are thus obtained 78 parts of 2-(N-isopropylcarbamyl)-4-methyl-2-imidazoline, m.p. 120°-121° C, corresponding to a yield of 92 percent of theory.

EXAMPLE 8

In a manner similar to that described in Example 7 87 parts of N-cyclohexylchloroacetamide are reacted with 32 parts of sulfur and 74 parts of 1,2-propylene diamine. There are obtained 90 parts of 2-(N-cyclohexylcarbamyl)-4-methyl-2-imidazoline, m.p. 126°-128° C, corresponding to a yield of 86 percent of theory.

What we claim is:
1. A 2-carbamyl-2-imidazoline of the formula

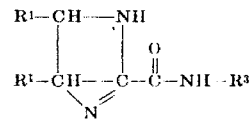

wherein the groups $R^1$ respectively denote hydrogen, lower alkyl or cyclohexyl and $R^3$ denotes hydrogen, alkyl of one to 18 carbon atoms, cycloalkyl of five to 12 carbon atoms, phenyl, benzyl, chlorotolyl or chlorophenyl.

2. A process for the production of a 2-carbamyl-2-imidazoline of the formula:

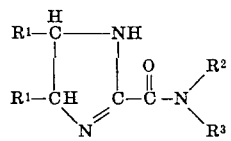

where the groups $R^1$ respectively denote hydrogen, lower alkyl or cyclohexyl, $R^2$ and $R^3$ respectively denote hydrogen, alkyl of one to 18 carbon atoms, cycloalkyl of five to 12 carbon atoms, phenyl, tolyl, chlorophenyl, chlorotolyl or benzyl, or $R^2$ and $R^3$ together with their nitrogen atom denote morpholyl, piperidyl or piperazyl, which comprises reacting a haloacetamide of the formula:

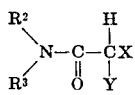

where $R^2$ and $R^3$ have the meanings stated above and where X is a halogen atom and Y is hydrogen or a halogen atom, with a 1,2-alkylene diamine of the formula:

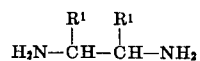

where the groups $R^1$ have the meaning stated above, and at least a stoichiometric amount of elementary sulfur.

3. A process as claimed in claim 2 wherein the reaction is carried out with one or both of the diamine and the sulfur present in excess up to 1.5 times, based on the haloacetamide.

4. A process as claimed in claim 2 wherein the reaction is carried out at a temperature between 50° and 180°C.

5. A process as claimed in claim 2 wherein the reaction is carried out at a temperature between 80° and 150°C.

6. A process as claimed in claim 2 wherein the reaction is carried out in an organic solvent which is inert under the conditions of reaction and which is present in a ratio of from 1 to 10 moles of solvent to 1 mole of the haloacetamide.

* * * * *